No. 858,481. PATENTED JULY 2, 1907.
N. W. STORER & W. COOPER.
SYSTEM OF CONTROL FOR ELECTRIC MOTORS.
APPLICATION FILED JULY 24, 1905.
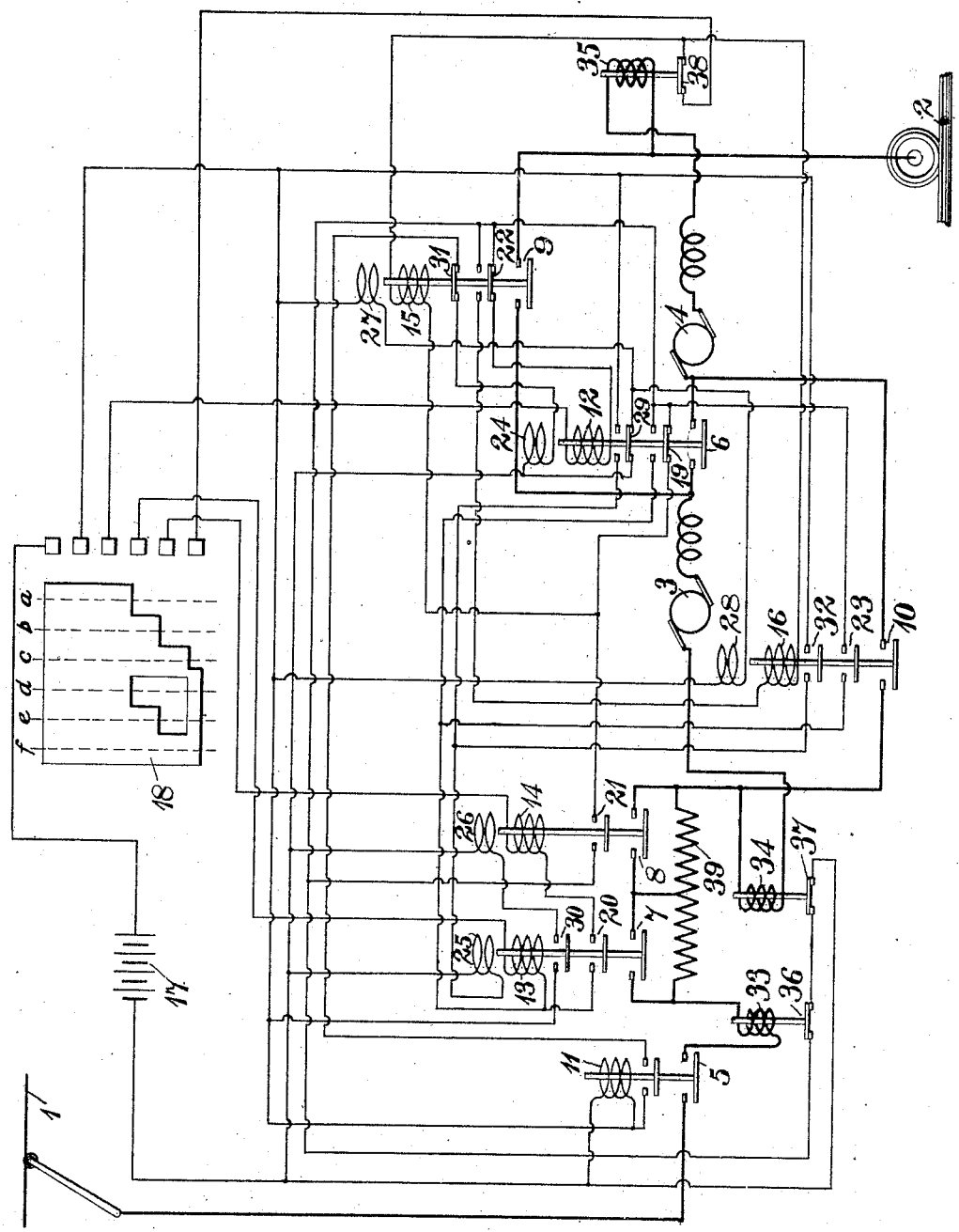
WITNESSES:
Fred. H. Miller
Otto S. Schairer
INVENTORS
Norman W. Storer
& William Cooper
BY
Wesley G. Carr
ATTORNEY

UNITED STATES PATENT OFFICE.

NORMAN W. STORER, OF PITTSBURG, AND WILLIAM COOPER, OF WILKINSBURG, PENNSYLVANIA, ASSIGNORS TO WESTINGHOUSE ELECTRIC & MANUFACTURING COMPANY, A CORPORATION OF PENNSYLVANIA.

SYSTEM OF CONTROL FOR ELECTRIC MOTORS.

No. 858,481.     Specification of Letters Patent.     Patented July 2, 1907.

Application filed July 24, 1905. Serial No. 271,067.

*To all whom it may concern:*

Be it known that we, NORMAN W. STORER and WILLIAM COOPER, citizens of the United States, and residents, respectively, of Pittsburg and of Wilkinsburg, in the county of Allegheny and State of Pennsylvania, have invented certain new and useful Improvements in Systems of Control for Electric Motors, of which the following is a specification.

Our invention relates to systems of control for electric motors, and particularly to such systems as operate to change the motors from series to parallel relation during acceleration.

One of the objects of our invention is to provide means for preventing the application of more than a predetermined amount of current to a plurality of motors regardless of whether the motors are connected in series or in parallel relation to each other.

Another object of our invention is to provide means for preventing a change in the circuit relations of the motors from series to parallel until the motors have attained such a speed that more than the aforesaid predetermined amount of current may not be supplied to the motors immediately after being connected in parallel.

Our invention also provides means for preventing the current supplied to the motors from exceeding one predetermined amount when the motors are connected in series relation and from exceeding another and a higher predetermined amount when the motors are connected in parallel relation.

In practicing the series-parallel method of control of electric motors, the motors have usually been accelerated at a substantially constant rate until full voltage was applied to them. The result has been that each motor has been supplied with the same average amount of current whether the motors were connected in series or in parallel relation. Under these conditions, twice as much current has been supplied to a car having two motors when the motors were connected in parallel relation as has been supplied when the motors were connected in series. Since it is the maximum amount of current that must be delivered which determines the capacity of many stations, it is evidently desirable to limit the fluctuations in the amount of current to the minimum which will permit of fulfilment of the required service conditions. This is particularly desirable in railway systems that operate a small number of cars, only one of which may, perhaps, be supplied at a time by any sub-station.

In an application Serial No. 271,057, filed of even date herewith by one of us, *i. e.*, NORMAN W. STORER, is described and claimed a method of operating electric motors whereby the average amount of current supplied to a car during acceleration may be maintained substantially constant and may be prevented from exceeding a predetermined amount whether the motors are connected in series or in parallel, thereby preventing extreme fluctuations in the amount of current that must be delivered by a sub-station, and it is one of the objects of the present invention to provide a means for practicing this method.

In order to obtain the same average acceleration in the use of our invention that may be obtained without its use, it will be necessary to accelerate more rapidly when the motors are connected in series than when they are connected in parallel, and this may be possible if sufficient weight is placed upon the driving wheels to prevent slipping between the driving wheels and the track rails when the motors are so connected. The maximum amount of current which may properly be supplied to the motors when connected in series is that which will cause them to exert the greatest possible torques without producing slipping. If, with this maximum permissible current, it is impossible to obtain the desired average acceleration in speed, a larger amount of current may be supplied to the motors when connected in parallel than when connected in series, though this larger amount must be less than twice the smaller amount if it is desired to limit the fluctuations in the load upon the system.

While the invention is broadly applicable to all systems of control in which the circuit relations of the motors may be changed, it is especially applicable to systems in which the operation of a plurality of switches located in the motor circuits may be governed by means of a master switch and in which the switches operate successively and automatically as the motors accelerate in speed, the rate of acceleration being dependent upon the amount of current traversing the motor circuits. The switches in such systems are usually provided with magnet windings, which serve, directly or indirectly, to retain the switches in closed-circuit positions after they have once been closed.

Means have heretofore been provided for preventing further operation of the motor-controlling switches when the current supplied to the motors exceeds a predetermined amount, such means comprising a limit-switch the controlling magnet winding of which is connected in circuit with both of the motors, while the motors are connected in series, and in circuit with only one of the motors when the motors are connected in parallel. Under ordinary conditions, such means have served only to limit the amount of current which may be supplied to one of the motors when the motors are connected in parallel and, consequently, in the use of such systems, twice as much current may be supplied to a car when the motors are connected in parallel as when they are connected in series.

Our invention consists in providing a limit-switch the controlling magnet winding of which is always connected in circuit with both of the motors and serves to limit the current that may be supplied to the motors to substantially the same amount, whether they are connected in series or in parallel.

If it is desired to supply more current to a car when the motors are connected in parallel than when they are connected in series in order to obtain the desired average acceleration in speed, we provide two limit-switches, one of which is always connected in circuit with both of the motors and which serves to prevent the current supplied to the motors from exceeding a predetermined amount when the motors are connected in parallel. The other limit switch is connected in circuit with both of the motors when they are connected in series and with only one of them when they are connected in parallel, and serves to prevent the current supplied to the motors from exceeding a predetermined amount, which is less than the previously stated predetermined amount, when the motors are connected in series.

In changing from series to parallel connection of the motors, the amount of current supplied to them may increase greatly, and our invention further provides means for preventing a change in the circuit relations of the motors until they have attained such a speed while connected in series that the amount of current which will ordinarily be supplied to them immediately after being connected in parallel may not exceed the predetermined amount for parallel operation.

The single figure of the accompanying drawing is a diagram of a system embodying our invention.

Energy may be supplied from a trolley conductor 1 and a track rail 2 to motors 3 and 4, the circuit conditions and connections of which are governed by means of switches 5, 6, 7, 8, 9 and 10. Switches 5 to 10, inclusive, are provided with operating or controlling magnet windings 11, 12, 13, 14, 15 and 16, respectively, which are adapted to be supplied with energy from any suitable source, such as a battery 17. The circuits of the operating or controlling magnet windings are governed, primarily, by means of a master switch 18 and, secondarily, by means of interlocking switches 19, 20, 21, 22 and 23, which insure closure of the switches in a predetermined order. The switches 6 to 10, inclusive, are also provided with retaining magnet windings 24, 25, 26, 27 and 28, which serve to retain the switches in their closed-circuit positions, after they have once been moved to those positions, regardless of whether or not the operating magnet windings remain energized.

The circuits of the retaining magnet windings are governed, primarily, by the master switch 18 and, secondarily, by means of interlocking switches 29, 30, 31 and 32 that are operated, respectively, by means of switches 6, 7, 9 and 10 and that serve to insure energizing of the retaining magnet windings in a predetermined order.

Permanently connected in circuit with the motors, are magnet windings 33, 34 and 35 that control the operation of switches 36, 37 and 38, respectively. The switches 36 and 37 are located in the circuit with the operating magnet windings of switches 6 to 10, inclusive, and are adapted to be opened when the current supplied to the motors exceeds a predetermined amount.

The amount of current at which the switch 37 may be set to trip is the maximum permissible amount that may be supplied to the motors when operating in series relation with each other, and the amount of current at which the switch 36 will open may be the maximum permissible amount of current that may be supplied to the motors when operating in parallel. Evidently, if both switches are set to operate at the same amount of current, the motors will accelerate in speed when supplied with an approximately constant amount of current, or if switch 36 is set to operate at a larger amount of current than that at which the switch 37 will operate, more current may be supplied to both motors when operating in parallel than when operating in series. The amount of current, however, at which the switch 36 will operate should not be twice that at which the switch 37 will operate if it is desired to limit the fluctuation in amount of current to be supplied to a car.

The switch 38 is located in the circuit of the controlling magnet windings 15 and 16 and, when open, prevents closing of the switches 9 and 10 for the purpose of connecting the motors in parallel relation. The amount of current at which the switch 38 may be set to open should be less than that at which the switch 37 will operate, in order that current may not be supplied to the motors immediately after being connected in parallel in excess of the maximum predetermined amount for parallel operation. During acceleration, the switch 38 will in most cases remain open except for a period of sufficient duration to permit closing of the switches 9 and 10, which are then maintained in closed positions by the magnet windings 27 and 28.

It will be readily understood that when it is desired to accelerate the speed of the motors by the utilization of an approximately constant amount of current, only switches 36 and 38 need be employed.

The function that is performed by the switch 38 of delaying operation of the switches which connect the motors in parallel until the current supplied has fallen below a predetermined amount, may also be served by a dash-pot (not shown) attached to the switch 9, or any other suitable means may be employed for this purpose.

In the operation of the system, the master switch 18 is first moved to position $a$ and the switches 5 and 6 close, thus connecting the motors in series with each other and with a resistance 39. If the master switch is moved to position $b$, the switch 7 will close and a portion of the resistance 39 will be shunted. If the master switch is moved to position $c$, switch 8 will close and the remaining portion of the resistance 39 will be shunted. If the master switch is moved to position $d$, switch 9 will close, switches 6, 7 and 8 will open and switch 10 will close and the motors will then be connected in parallel with the resistance 39 in circuit. If the master switch is moved to positions $e$ and $f$, the switches 7 and 8 will close in succession and the resistance 39 will be shunted.

If the master switch is moved directly to the position $c$, the switches will close automatically, in the order previously stated, until the motors are connected in series with no resistance in the circuit, and if the master switch is then moved to the position f, the switches will close automatically, in the order previously stated, until the motors are connected in parallel relation with no resistance in circuit, the order of closure of the switches being governed by means of the interlocking switches. If the master switch is moved directly to position f, the switches will close automatically in the proper order until the motors are connected in full parallel relation.

Since the details of operation of the system and the specific functions of the interlocking switches form no part of our present invention, and since the system operates, in all substantial details, similarly to that described in patent No. 773,833, granted November 1, 1904, to George Westinghouse, upon an application filed by George Westinghouse and Louis M. Aspinwall, we deem it unnecessary to describe the control circuits more particularly.

When either of the switches 36 and 37 is open, the circuits of the operating magnet windings of the switches 6 to 10, inclusive, are open, while one or more of the retaining magnet windings 24 to 28, inclusive, may be energized and thus maintain the circuit conditions as they were previous to opening of the switches 36 and 37. Normal operation of the system may be resumed only after the current delivered to the motors has fallen below the predetermined amount which caused the switches 36 and 37 to open. As before described, the switches 9 and 10 which connect the motors in parallel relation cannot be closed while the switch 38 is open; that is, while the current supplied to the motors when connected in series exceeds a predetermined amount less than the predetermined amount which will cause the switch 37 to open.

While we have shown a system of control for two motors, it will be understood that it may be applied to four or more motors and that the number, structure and arrangement of control switches and the circuits therefor may be modified, within the scope of our invention, to meet the conditions imposed by the employment of a greater number of motors or otherwise. By suitable modifications of the governing circuits, our invention may also be practiced in combination with any other means for effecting changes in the circuit relations of the motors, such as a drum form of controller.

We claim as our invention:

1. The combination with a plurality of electric motors and a plurality of switches for connecting the motors in series and in parallel relation and for further governing the motor circuits, of a switch for preventing operation of more of the switches if the current supplied to all of the motors, when connected in series, exceeds a predetermined amount, and a switch for preventing operation of more of the switches if the current supplied to all of the motors, when connected in parallel, exceeds another and higher predetermined amount.

2. The combination with two or more electric motors, switches for controlling the circuits thereof, and controlling and retaining magnet windings therefor, of means for interrupting the circuits of the controlling magnet windings when the current supplied to all of the motors exceeds a predetermined amount, regardless of the circuit relations of the motors.

3. The combination with two or more electric motors, switches for controlling the circuits thereof, and controlling and retaining magnet windings therefor, of a switch for interrupting the circuits of the controlling magnet windings when the current supplied to all of the motors exceeds a predetermined amount, regardless of the circuit relations of the motors.

4. The combination with a plurality of electric motors, a plurality of switches for connecting the motors in series or in parallel relation and for further governing the motor circuits, and controlling and retaining magnet windings for the switches, of means for preventing energizing of more of the switch-controlling magnet windings when the current supplied to all of the motors exceeds a predetermined amount, whether the motors are connected in series or in parallel relation to each other.

5. The combination with a plurality of electric motors, a plurality of switches for connecting the motors in series or in parallel relation and for further governing the motor circuits, and controlling and retaining magnet windings for the switches, of a switch for preventing energizing of more of the switch-controlling magnet windings when the current supplied to all of the motors exceeds a predetermined amount, whether the motors are connected in series or in parallel relation to each other.

6. The combination with a plurality of electric motors, a plurality of switches for connecting the motors in series or in parallel relation and for further governing the motor circuits, and controlling and retaining magnet windings for the switches, of means for preventing energizing of more of the switch-controlling magnet windings if the current supplied to all of the motors, when connected in series, exceeds a predetermined amount, and means for preventing energizing of more of the switch-controlling magnet windings if the current supplied to the motors, when connected in parallel relation, exceeds another and larger predetermined amount.

7. The combination with a plurality of electric motors, a plurality of switches for connecting the motors in series or in parallel relation and for further governing the motor circuits, and controlling and retaining magnet windings for the switches, of a switch for preventing energizing of more of the switch-controlling magnet windings if the current supplied to all of the motors, when connected in series, exceeds a predetermined amount, and a switch for preventing energizing of more of the switch-controlling magnet windings if the current supplied to the motors, when connected in parallel relation, exceeds another and larger predetermined amount.

8. The combination with a plurality of electric motors and means for connecting them either in series or in parallel relation and for further regulating the circuit conditions, of means for preventing continued operation of the regulating means when the motors are connected in series relation and the current supplied thereto exceeds a predetermined amount, and means for preventing continued operation of the regulating means when the motors are connected in parallel relation and the current supplied thereto exceeds another and higher predetermined amount.

9. The combination with a plurality of electric motors and means for connecting the motors in series or in parallel relation, of means for preventing more than a predetermined amount of current being supplied to the motors when connected in series, and means for preventing a change of the circuit relations from series to parallel when the current supplied to the motors exceeds a predetermined amount that is less than the aforesaid predetermined amount.

10. The combination with a plurality of electric motors and means for connecting the motors in series or in parallel relation, of means for preventing more than a predetermined amount of current being supplied to the motors when connected in series, means for preventing a change of the circuit relations from series to parallel when the current supplied to the motors exceeds a predetermined amount that is less than the aforesaid predetermined amount, and means for preventing the current supplied to the motors, when connected in parallel, exceeding a predetermined amount that is greater than either of the aforesaid predetermined amounts.

11. The combination with a plurality of electric motors and means for connecting the motors in series or in parallel relation, of means for preventing more than a predetermined amount of current being supplied to the motors, and means for preventing a change of the circuit relations from series to parallel when the current supplied to the motors exceeds a predetermined amount that is less than the aforesaid predetermined amount.

12. The combination with a plurality of electric motors and switches for controlling the circuit relations of the motors, of means for preventing operation of the switches when the motors are connected in certain circuit relations and the current supplied thereto exceeds a predetermined amount, and means for preventing operation of the switches to effect changes in the circuit relations of the motors when the current supplied thereto exceeds a predetermined amount less than the aforesaid predetermined amount.

13. The combination with a plurality of electric motors and switches for controlling the circuit relations of the motors, of a switch for preventing operation of the switches when the motors are connected in certain circuit relations and the current supplied thereto exceeds a predetermined amount, and a switch for preventing operation of the switches to effect changes in the circuit relations of the motors when the current supplied thereto exceeds a predetermined amount less than the aforesaid predetermined amount.

14. The combination with a plurality of electric motors and a plurality of switches for connecting the motors in series or in parallel relation and for further governing the motor circuits, of means for preventing operation of the switches when the motors are connected in series and the current supplied thereto exceeds a predetermined amount, and means for preventing operation of the switches to effect changes in the circuit relations of the motors when the current supplied thereto exceeds a predetermined amount less than the aforesaid predetermined amount.

15. The combination with a plurality of electric motors and a plurality of switches for connecting the motors in series or in parallel relation and for further governing the motor circuits, of a switch for preventing operation of the aforesaid switches when the motors are connected in series and the current supplied thereto exceeds a predetermined amount, and a switch for preventing operation of the aforesaid switches to effect changes in the circuit relations of the motors when the current supplied thereto exceeds a predetermined amount less than the aforesaid predetermined amount.

16. The combination with a plurality of electric motors and a plurality of switches for connecting the motors in series or in parallel relation and for further governing the motor circuits, of means for preventing operation of the switches when the motors are connected in series and the current supplied thereto exceeds a predetermined amount, means for preventing operation of the switches to effect changes in the circuit relations of the motors when the current supplied thereto exceeds a predetermined amount less than the aforesaid predetermined amount, and means for preventing the operation of the switches when the motors are connected in parallel relation and the current supplied to the motors exceeds a predetermined amount greater than either of the aforesaid predetermined amounts.

17. The combination with a plurality of electric motors and a plurality of switches for connecting the motors in series or in parallel relation and for further governing the motor circuits, of a switch for preventing operation of the aforesaid switches when the motors are connected in series and the current supplied thereto exceeds a predetermined amount, a switch for preventing operation of the aforesaid switches to effect changes in the circuit relations of the motors when the current supplied thereto exceeds a predetermined amount less than the aforesaid predetermined amount, and a switch for preventing the operation of the aforesaid switches when the motors are connected in parallel relation and the current supplied to the motors exceeds a predetermined amount greater than either of the aforesaid predetermined amounts.

In testimony whereof, we have hereunto subscribed our names this 18th day of July, 1905.

NORMAN W. STORER.
WILLIAM COOPER.

Witnesses:
F. E. WYNNE,
BIRNEY HINES.